US011789522B2

United States Patent
Nguyen et al.

(10) Patent No.: US 11,789,522 B2
(45) Date of Patent: Oct. 17, 2023

(54) GENERATING AND/OR ADAPTING AUTOMATED ASSISTANT CONTENT ACCORDING TO A DISTANCE BETWEEN USER(S) AND AN AUTOMATED ASSISTANT INTERFACE

(71) Applicant: Google LLC, Mountain View, CA (US)

(72) Inventors: Tuan Nguyen, San Jose, CA (US); Kenneth Mixter, Los Altos Hills, CA (US); Yuan Yuan, Redwood City, CA (US)

(73) Assignee: GOOGLE LLC, Mountain View, CA (US)

( * ) Notice: Subject to any disclaimer, the term of this patent is extended or adjusted under 35 U.S.C. 154(b) by 327 days.

(21) Appl. No.: 17/135,272

(22) Filed: Dec. 28, 2020

(65) Prior Publication Data

US 2021/0117720 A1 Apr. 22, 2021

Related U.S. Application Data

(63) Continuation of application No. 16/618,532, filed as application No. PCT/US2018/031163 on May 4, 2018, now Pat. No. 10,878,279.

(51) Int. Cl.
*G06F 3/01* (2006.01)
*G06T 7/73* (2017.01)
(Continued)

(52) U.S. Cl.
CPC .............. *G06F 3/011* (2013.01); *G06F 3/013* (2013.01); *G06F 3/017* (2013.01); *G06F 3/0304* (2013.01);
(Continued)

(58) Field of Classification Search
CPC .......... G06F 3/011; G06F 3/013; G06F 3/017; G06F 3/0304; G06F 3/0482; G06F 3/167;
(Continued)

(56) References Cited

U.S. PATENT DOCUMENTS 6,971,072 B1 11/2005 Stein
8,203,577 B2 6/2012 Hoover
(Continued)

FOREIGN PATENT DOCUMENTS

EP 3279790 A1 2/2018
EP 3419020 12/2018
(Continued)

OTHER PUBLICATIONS

European Patent Office; Communication pursuant to article 94(3) EPC issued in Application No. 18729824.5; 7 pages; dated Oct. 14, 2021.
(Continued)

*Primary Examiner* — Nay A Maung
*Assistant Examiner* — Jose M Torres
(74) *Attorney, Agent, or Firm* — Gray Ice Higdon

(57) ABSTRACT

Methods, apparatus, systems, and computer-readable media are provided for generating and/or adapting automated assistant content according to a distance of a user relative to an automated assistant interface that renders the automated assistant content. For instance, the automated assistant can provide data for a client device to render. The client device can request additional data when the user relocates closer to, or further from, the client device. In some implementations, a request for additional data can identify a distance between the user and the client device. In this way, the additional data can be generated or selected according to the distance in the request. Other implementations can allow an automated assistant to determine an active user from a group of users
(Continued)

in an environment, and determine a distance between the active user and the client device in order that any rendered content can be tailored for the active user.

18 Claims, 6 Drawing Sheets

(51) Int. Cl.
| | | |
|---|---|---|
| *G06F 9/451* | (2018.01) | |
| *G06F 3/03* | (2006.01) | |
| *G06F 3/16* | (2006.01) | |
| *G06F 3/0482* | (2013.01) | |
| *G06V 40/20* | (2022.01) | |
| *G06F 18/22* | (2023.01) | |

(52) U.S. Cl.
CPC ............ *G06F 3/0482* (2013.01); *G06F 3/167* (2013.01); *G06F 9/453* (2018.02); *G06F 18/22* (2023.01); *G06T 7/74* (2017.01); *G06V 40/20* (2022.01)

(58) Field of Classification Search
CPC .......... G06F 9/451; G06F 9/453; G06F 18/22; G06T 7/74; G06V 40/20
See application file for complete search history.

(56) References Cited

U.S. PATENT DOCUMENTS

| | | |
|---|---|---|
| 9,588,408 B1 | 3/2017 | Linnell |
| 10,878,279 B2 | 12/2020 | Nguyen et al. |
| 2003/0210258 A1 | 11/2003 | Williams |
| 2004/0036717 A1 | 2/2004 | Kjeldsen et al. |
| 2005/0229200 A1 | 10/2005 | Kirkland et al. |
| 2009/0079765 A1 | 3/2009 | Hoover et al. |
| 2009/0106653 A1 | 4/2009 | Lee et al. |
| 2010/0046803 A1 | 2/2010 | Tomita |
| 2011/0211114 A1 | 9/2011 | Cooper |
| 2011/0298980 A1 | 12/2011 | Adhikari et al. |
| 2012/0062729 A1 | 3/2012 | Hart et al. |
| 2012/0246678 A1 | 9/2012 | Barksdale |
| 2013/0027614 A1 | 1/2013 | Bayer et al. |
| 2013/0307764 A1 | 11/2013 | Denker et al. |
| 2014/0010418 A1 | 1/2014 | Dey et al. |
| 2014/0055591 A1 | 2/2014 | Katz |
| 2014/0111694 A1 | 4/2014 | Candelore |
| 2015/0169284 A1 | 6/2015 | Quast et al. |
| 2015/0309580 A1 | 10/2015 | Kumar et al. |
| 2016/0345039 A1 | 11/2016 | Billmeyer |
| 2017/0289766 A1 | 10/2017 | Scott et al. |
| 2017/0300831 A1 | 10/2017 | Gelfenbeyn et al. |
| 2018/0232662 A1* | 8/2018 | Solomon ............... H04N 23/611 |
| 2021/0082083 A1* | 3/2021 | Leong .................. G06V 10/753 |

FOREIGN PATENT DOCUMENTS

| | | |
|---|---|---|
| JP | 03048866 | 3/1991 |
| JP | H0348866 A | 3/1991 |
| JP | 2005534065 A | 11/2005 |
| JP | 2006236013 A | 9/2006 |
| JP | 2010049313 A | 3/2010 |
| JP | 2012181748 A | 9/2012 |
| JP | 2017144521 | 8/2017 |
| JP | 2018055155 A | 4/2018 |
| WO | 2004012184 A1 | 2/2004 |
| WO | 2016157662 A1 | 10/2016 |
| WO | 2017184587 A1 | 10/2017 |

OTHER PUBLICATIONS

Japanese Patent Office; Notice of Reasons for Rejection issued in Application No. 2021-512355; 16 pages dated Jan. 11, 2022.
The Korean Intellectual Property Office; Notice of Office Action issued in Application No. 1020207033967; 14 pages; dated Nov. 29, 2022.
Intellectual Property India; Examination Report issued in Application No. 202027050431; 6 pages; dated Sep. 24, 2021.
European Patent Office; International Search Report and Written Opinion of Application No. PCT/US2018/031163; 19 pages; dated Jan. 22, 2019.
Japanese Patent Office; Notice of Allowance issued in Application No. 2021-512355, 3 pages, dated Apr. 25, 2022.
Japanese Patent Office; Notice of Reasons for Rejection issued in Application No. 2022084510; 9 pages; dated Jun. 12, 2023.

* cited by examiner

GENERATING AND/OR ADAPTING AUTOMATED ASSISTANT CONTENT ACCORDING TO A DISTANCE BETWEEN USER(S) AND AN AUTOMATED ASSISTANT INTERFACE

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e. utterances), which may in some cases be converted into text and then processed, and/or by providing textual (e.g., typed) natural language input. An automated assistant responds to a request by providing responsive user interface output, which can include audible and/or visual user interface output.

SUMMARY

Applicant has recognized that when an automated assistant is causing user interface output to be rendered for presentation to a user (e.g., in response to a request from a user), the user interface output is typically rendered without regard to a distance of the user relative to the user interface output device(s) rendering the content. As a result, the user may be unable to perceive the user interface output from his/her current location (e.g., displayed output may be too small and/or audible output may be too low volume). This can cause the user to need to relocate and provide user interface input requesting the output be rendered again. Processing such user interface input and/or again rendering the content can cause excess consumption of computational and/or network resources. Moreover, for a user with low dexterity, they may have difficulty relocating to a position where the user interface input can be perceived. Additionally or alternatively, user interface output from an automated assistant can be rendered in a manner that is more computationally expensive than necessary, as a result of rendering the output without regard to the distance of the user. For example, audible output may be rendered at a higher volume than needed and/or displayed output can be displayed via multiple frames for a longer duration than if the content of the multiple frames were instead displayed via a single frame.

Moreover, Applicant has recognized that when user interface output is being rendered, the user may relocate, potentially interrupting the ability of the user to perceive further output from the automated assistant. Furthermore, when the automated assistant is causing a particular client device to provide an output and the user moves closer to the client device, the user may desire to perceive more output because of their proximity to a particular interface of the client device. However, because many automated assistants are typically not cognizant of user distance, they may cause computational resources to be wasted on rendering outputs that may not be perceived by a user. Furthermore, given the number of ways a user can perceive an output, computational resources may not be efficiently employed when a rendered output is not adapted for a nearby user.

Implementations disclosed herein are directed to methods, apparatus, and computer-readable media (transitory and non-transitory) for generating and/or adapting automated assistant content according to a distance of at least one user relative to an automated assistant interface that renders the automated assistant content. Some implementations that generate automated assistant content according to a distance of at least one user generate the content based on generating an agent request that includes a distance metric that is based on a current determined distance of the user. The current distance of the user can be determined based on signal(s) from one or more sensor(s), such as vision sensor(s) (e.g., monographic cameras, stereographic cameras), dedicated distance sensor(s) (e.g., laser rangefinder), microphones (e.g., using beamforming and/or other techniques). Further, the agent request is submitted to a corresponding agent, and the corresponding agent responds to the agent request with agent data that is adapted to the distance metric. The automated assistant can then provide the agent data (or a conversion thereof) as content for rendering to the user. User interaction with the automated assistant is improved as the content is adapted to the distance metric and is easily perceivable by the user at his/her current distance. Further, the agent data can be a subset of candidate agent data that is available for the request, where the subset is selected by the agent based on conformance of the subset to the distance metric of the agent request. In these and other manners, only the subset of candidate agent data is provided by the agent in lieu of the entirety of candidate agent data (which would require greater network resources to transmit). Further, an automated assistant client device that renders the content can receive only the subset of agent data (or a conversion thereof) in lieu of the entirety of the candidate agent data (or a conversion thereof). The specific nature of the content, adapted to the distance metric, may ensure an efficient use of computing and other hardware resources at the computing apparatus, such as a user device, running the automated assistant. This is at least because implementation of potentially computationally expensive capabilities of the assistant which are non-perceivable by the user is avoided. For example, there can be a conservation of network resources (e.g., in transmitting only the subset to the client device), memory resources at the client device (e.g., in buffering only the subset at the client device), and/or processor and/or power resources at the client device (e.g., in rendering only some or all of the subset).

As one non-limiting example of generating automated assistant content according to a distance of the user, assume the user is seven feet away from a display of a client device having an assistant interface. Further assume the user provides a spoken utterance of "local weather forecast." An estimated distance of the user can be determined based on signals from sensor(s) of the client device and/or other sensor(s) that are proximal to the client device. The spoken utterance can be processed to generate an agent request (e.g., that specifies an intent of "weather forecast" and a location value that corresponds to a location of the client device), and a distance metric that is based on the estimated distance of the user can be included in the agent request. The agent request can be transmitted to a corresponding agent and, in response, the corresponding agent can return graphical content that includes only a graphical representation of a three day weather forecast for the location. The graphical representation of the three day weather forecast can be transmitted to the client device and graphically rendered via the display of the client device. The corresponding agent can select the graphical representation of the three day weather forecast (e.g., in lieu of a one day, five day, or other variant weather forecast) based on a correspondence of the distance metric to the graphical representation of the three day weather forecast.

As a variant of the example, assume instead the user is twenty feet away from the display and provided the same spoken utterance of "local weather forecast." In such a variant, the distance metric included in the agent request would reflect an estimate of the twenty feet distance (instead of an estimate of the seven feet distance) and, as a result, the content returned by the agent in response to the request could include textual or audible content that conveys a three day weather forecast for the location—and could exclude any graphical content. The audible content (or the textual content, or audio that is a text-to-speech conversion of the textual content) can be transmitted to the client device for audibly rendering via speaker(s) of the client device, without any weather related graphical content being visually rendered. The corresponding agent can select the three day textual or audible weather forecast (e.g., in lieu of graphical representation of the weather forecast) based on a correspondence of the distance metric to the three day textual or audible weather forecast.

As yet a further variant of the example, assume instead the user is twelve feet away from the display and provided the same spoken utterance of "local weather forecast." In such a further variant, the distance metric included in the agent request would reflect an estimate of the twelve feet distance and, as a result, the content returned by the agent in response to the request could include textual or audible content that conveys a three day weather forecast for the location—and could also include graphical content that conveys only a one day (i.e., the current day) forecast for the location. The audible content (or the textual content, or audio that is a text-to-speech conversion of the textual content) can be transmitted to the client device for audibly rendering via speaker(s) of the client device, and the one day weather graphical content can also be transmitted for graphically rendering via the display of the client device. Again, the corresponding agent can select the returned content based on a correspondence of the distance metric to the returned content.

In some implementations, automated assistant content that is rendered by a client device can additionally or alternatively be adapted according to a distance of a user. For example, when the automated assistant is performing a particular automated assistant action, the automated assistant can "switch" between rendering different subsets of candidate automated assistant content, such as subsets of candidate automated assistant content that are locally available to a client device rendering the content (e.g., candidate automated assistant content stored in local memory of the client device). The automated assistant can use a distance measure at a given time in order to select a subset of candidate automated assistant content to be used for rendering at the client device at the given time. The candidate automated assistant content can be, for example, provided to the client device from a remote device in response to the remote device receiving a request associated with the automated assistant action. The provided content can correspond to automated assistant content that can be adapted by the client device for multiple different positions and/or distances of a user. In this way, so long as the user is maneuvering according to the corresponding positions and/or distances, the automated assistant can cause the rendering or presentation of the automated assistant content to be adapted according to changes in user position and/or user distance.

When the user maneuvers to a position and/or location that does not correspond to any suitable adaptation of rendered content (and/or maneuvers near to such position and/or location), the automated assistant can cause the client device to request additional automated assistant content for that position and/or location. The additional automated assistant content can then be used to render more suitable content at the client device.

As an example, the automated assistant can perform a routine that includes multiple different actions. The automated assistant can perform the routine in response to a user command (e.g., a spoken utterance, a tap of a user interface element) and/or in response to the occurrence of one or more conditions (e.g., based on detecting presence of a user, based on it being a certain time of day, based on a wake-up alarm being dismissed by the user). In some implementations, one of the actions of the multiple different actions of the routine can include rendering content corresponding to a podcast. The content can be rendered using data that is locally available at the client device, and can be adapted according to a distance of the user relative to the client device. For example, when the user is a first distance from the client device, the automated assistant can cause a portion of the available data to be rendered as content that is limited to audible content. Furthermore, when the user moves to a second distance, that is shorter than the first distance, the automated assistant can cause the rendered content to be adapted to include video content and/or can cause the audible content to be rendered at a higher volume. For instance, the video content can correspond to a video recording of an interview, from which the audio content was derived. The data that provides the basis for the audible content and the video content can be transmitted to the client device (e.g., by remote automated assistant component(s)) in response to initialization of the routine, and/or can be preemptively downloaded by the client device in advance of initialization of the routine (e.g., at the direction of the automated assistant in accordance with subscription data or user preferences that indicate the user would prefer such content to be automatically downloaded).

In these and other manners, rendered content can be adapted for changes in user position and/or user location without necessarily requesting additional data each time a user moves. This can reduce latency in adapting of the rendered content. Should a user maneuver to position or location that does not correspond to locally available data, the automated assistant can cause the client device to generate a request for additional data and/or the automated assistant can generate the request for the additional data. Optionally, the request can include information based on the distance measure. When the client device receives additional data in response (e.g., from a server that hosts podcast data), the automated assistant can cause the client device to render content—using the additional data and based on the distance data.

In some implementations, the client device can pre-emptively request and/or buffer content in anticipation of a user relocating to a position corresponding to particular rendered content. For instance, the client device can have locally available data corresponding to when a user is between 5 and 10 feet from the client device. When the user is within 5 to 10 feet of the client device, but is still moving toward the client device, the client device can render the locally available data and pre-emptively request additional data. The additional data can correspond to a distance between 2 and 5 feet from the client device, therefore, when the user enters an area that is between 2 and 5, the client device can render the additional data. This can reduce latency when switching between subsets of data to render as a user is moving toward or away from the client device.

As an example, the user can provide a spoken utterance such as, "Assistant, play my song." In response, the client device can request data that is correlated to various distances and determine, based on a detected distance of the user from the client device, content to be rendered based on the detected distance. For example, when a user is 20 feet away from the client device, the client device can render content that is limited to audio, and pre-emptively load album art that is pre-configured to be rendered when the user is less than 20 feet away but greater than 12 feet away. In some implementations, when the user moves to a location that is between 20 and 12 feet away, the album art can supplant any previous graphical content (e.g., lyrics) at the client device. Alternatively, or additionally, when the user is less than 12 feet away and 6 feet away, the client device can cause video to be rendered and synced with any audio that is being rendered. In some implementations, the rendered video can be based on data that was not locally available when the user was 20 feet away, but was requested by the client device in response to determining that the user is moving in a trajectory toward the client device. In this way, the requested data would be mutually exclusive from the data that is provided as a basis for the rendered audio data, and the rendered video would supplant any graphical content that would be rendered before the user reaches a distance of between 12 and 6 feet away from the client device. Yet further, when the user is less than 6 feet away, the client device can continue to cause the video to be rendered, but can further additionally visually render touchable media controls (e.g., back, pause, and/or forward interactive control elements), whereas those controls were not rendered prior to the user being less than 6 feet away.

In some implementations, multiple users can be in an environment that is shared by a client device with access to an automated assistant. Therefore, determining a distance measure can depend on at least one user that is "active" or otherwise directly or indirectly engaging with the automated assistant. For example, one or more sensors in communication with a client device can be employed to detect whether a user is an active user in a group of multiple people. For instance, data generated from output of visual sensor(s) (e.g., camera(s) of the client device) can be processed to determine an active user from among a plurality of users based on, for example, a pose, a gaze, and/or a mouth movement of the active user. As one particular instance, a single user can be determined to be an active user based on the pose and the gaze of the user being directed toward the client device, and based on the pose(s) and the gaze(s) of the other user(s) not being directed toward the client device. In the particular instance, the distance measure can be based on a determined distance of the single user (which can be determined based on the output from the visual sensor(s) and/or output from other sensor(s)). As another particular instance, two users can be determined to be active users based on the poses and the gazes of the two users being directed toward the client device. In such another particular instance, the distance measure cane be based on determined distances of the two users (e.g., an average of the two distances).

Alternatively, or additionally, audible data generated from output of transducer(s) (e.g., microphone(s) of the client device) can be processed using beamforming, voice identification, and/or other technique(s) to identify an active user from among a plurality of users. For instance, a spoken utterance can be processed using beamforming to estimate a distance of a user providing the spoken utterance, and the user providing the spoken utterance considered the active user and the estimated distance utilized as the distance for the active user. Also, for instance, voice identification of a spoken utterance can be utilized to identify a user profile that conforms to the spoken utterance, and an active user in captured image(s) can be determined based on facial and/or other feature(s) of the active user conforming to corresponding feature(s) in the user profile. As yet another instance, a spoken utterance can be processed using beamforming to estimate a direction of a user providing the spoken utterance, and an active user that provided the spoken utterance determined based on the active user being in that direction in captured image(s) and/or other sensor data. In these and other manners, an active user, among multiple users in an environment of a client device, can be identified, and content generated and/or adapted to that active user in lieu of other user(s) in the environment. Such information can thereafter to be used as a basis from which to generate and/or adapt content for the user. In other implementations, a voice signature or voice identifier (ID) for a user can be detected, and the voice signature and/or voice ID can be processed in combination with one or more images from a camera to identify a status of a user. For example, audio data collected based on an output of a microphone can be processed to detect voice characteristics and compare the voice characteristics to one or more profiles accessible to the automated assistant. A profile that most correlates to the voice characteristics can be used for determining how to generate and/or adapt content for the user.

The above description is provided as an overview of some implementations of the present disclosure. Further description of those implementations, and other implementations, are described in more detail below.

In some implementations, a method implemented by one or more processors is provided that includes receiving a request for an automated assistant to initialize performance of an action. The automated assistant is accessible via an automated assistant interface of a client device that is in communication with a display device and a sensor, and the sensor provides an output indicative of a distance of a user relative to the display device. The method further includes, determining, based on the output of the sensor, a distance measure corresponding to an estimated distance of the user relative to the display device. The method further includes identifying, based on the received request, an agent for completing the action. The agent is accessible to the automated assistant and is configured to provide data for the client device based on the estimated distance of the user relative to the display device. The method further includes, in response to receiving the request and identifying the agent based on the received request, generating an agent request for the identified agent to provide content items in furtherance of the action. The agent request identifies the determined distance measure. The method further includes transmitting the agent request to the agent to cause the agent to select a subset of content items for the action based on a correspondence between the subset of candidate content items and the distance measure included in the agent request, wherein the subset of the candidate content items is configured to be rendered at the client device uniquely, relative to other content items excluded from the subset of content items. The method further includes causing the client device to render the selected subset of candidate content items.

These and other implementations of the technology disclosed herein can include one or more of the following features.

In some implementations, the subset of content items includes a first subset that corresponds to a first range of distances that encompasses the estimated distance of the user, and a second subset that corresponds to a second range of distances. The second range of distances excludes the estimated distance and has a common boundary with the first range of distances. In those implementations, causing the client device to render the selected subset of candidate content items includes: causing the client device to initially render only the first subset; and causing the client device to buffer the second subset, and then render the second subset in response to determining the user has moved to a new distance that is within the second range of distances. In some versions of those implementations, causing the client device to render the second subset includes causing the client device to supplant the first subset with the second subset in response to determining the user has moved to the new distance. In some of those versions the second subset can optionally lack any content that is included in the first subset. In some other versions of those implementations, the first subset includes audio data, the second subset includes graphical content, causing the client device to initially render only the first subset includes causing the client device to audibly render the audio data, and causing the client device to render the second subset includes causing the client device to render the graphical content along with the audible rendering of the audio data. In some of those other versions, the graphical content is an image, or the graphical content is a video that is synchronously rendered with the audio data. In some additional or alternative versions, the agent selects the first subset based on first subset corresponding to the first range of distances that encompasses the estimated distance of the user that corresponds to the distance measure, and the agent selects the second subset based on the estimated distance of the user being within a threshold distance of the second range of distances that corresponds to the second subset. In yet other additional or alternative versions, the method further includes: determining, based on the output from the sensor, an estimated rate of change of the estimated distance; and including an indication of the estimated rate of change in the agent request. In those other additional or alternative versions, the agent selects the first subset based on first subset corresponding to the first range of distances that encompasses the estimated distance of the user that corresponds to the distance measure, and the agent selects the second subset based on the indication of the estimated rate of change.

In some implementations, the user and one or more additional users are in an environment with the client device, and the method further includes determining that the user is a currently active user of the automated assistant. In those implementations, determining the distance measure corresponding to the estimated distance of the user includes determining the distance measure of the user, in lieu of the one or more additional users, in response to determining that the user is the currently active user of the automated assistant. In some of those implementations, determining that the user is the active user is based on one or both of: the output from the sensor, and additional output from at least one additional sensor. For example, the sensor or the additional sensor can include a camera, the output or the additional output can include one or more images, and determining that the user is the active user can be based on one or both of: a pose of the user determined based on the one or more images, and a gaze of the user determined based on the one or more images.

In some implementations, the method further includes, subsequent to transmitting the agent request to the agent and causing the client device to render the selected subset of candidate content items: determining a separate distance measure, wherein the separate distance measure indicates that the distance of the user relative to the display device has changed; in response to determining the separate distance measure, generating a separate agent request for the identified agent, wherein the separate agent request includes the separate distance measure; transmitting the separate agent request to the agent to cause the agent to select a separate subset of the candidate content items for the action based on a correspondence between the separate subset of the candidate content items and the separate distance measure included in the agent request; and causing the client device to render the selected separate subset of candidate content items.

In some implementations, the received request is based on a spoken utterance received at the automated assistant interface and includes audio data that embodies a voice signature of the user, and the method further includes: selecting, based on the voice signature of the user, a user profile that indicates a user preference associated with proximity-adaptive content. In those implementations, the subset of content items are selected based on the user preference.

In some implementations, the distance measure is embodied in the received request or is received separately from the received request.

In some implementations, the client device generates the distance measure from the output of the sensor and transmits the distance measure in the request or an additional transmission, and determining the distance measure is performed at a server device. For example, the server device can determine the distance measure based on inclusion of the distance measure in the request or the additional transmission, and can determine the distance measure without directly accessing the output of the sensor.

In some implementations, a method implemented by one or more processors is provided and includes: rendering first content in furtherance of an action previously requested by a user during an interaction between the user and an automated assistant. The automated assistant is accessible via an automated assistant interface of a client device and the first content is rendered based on a first subset of content items that is locally stored at the client device. The method further includes determining, based on an output of a sensor that is connected to the client device and while the client device is rendering the first content, that a location of the user has changed from a first position to a second position. The method further includes identifying, based on the output of the sensor, a second subset of content items from which to render second content in furtherance of the action. The second subset of content items includes data that is exclusive from the first subset of content items and is locally stored at the client device. The method further includes rendering the second content based on the identified second subset of content items. The method further includes monitoring a subsequent output of the sensor while the client device is rendering the second content; and when the subsequent output of the sensor indicates that the user has relocated to a third position that is different than the first position and the second position: determining that a third subset of content items, from which to render third content when the user is in the third position, is locally unavailable to the client device; and generating a request for receiving the third subset of content items from a remote server device that is accessible to the automated assistant.

These and other implementations of the technology disclosed herein can include one or more of the following features.

In some implementations, the third position is more proximate to the client device than the first position and the second position, and the method further includes: receiving the third subset of content items; and rendering the third content based on the third subset of content items. In some of those implementations, the first content is rendered via a first modality and the third content is rendered via a second modality that is different than the first modality. In some versions, rendering the third content includes supplanting the second content with the third content and/or the first modality is an audio modality and the first content is rendered via one or more speakers that are connected to the client device, and the second modality is a display modality and the third content is rendered via a display device that is connected to the client device.

In some implementations, the method further includes receiving a spoken utterance at the automated assistant interface of the client device, and the sensor includes one or more microphones that are integral to the automated assistant interface and are configured to be responsive to audible inputs from the user. In some of those implementations, the method further includes determining, based on audio data corresponding to the received spoken utterance, a target application for performing the action and an orientation of the user relative to the client device.

In some implementations, the sensor includes a camera, and the method further includes, when the subsequent output of the sensor indicates that the user has relocated to the third position: determining, based on one or more images captured by the camera, whether the user is an active user based on one or multiple of: a pose of the user determined based on processing of the one or more images, a gaze direction of the user determined based on processing of the one or more images, a mouth movement of the user determined based on processing of the one or more images, and a gesture of the user detected based on processing of the one or more images.

In some implementations, a method implemented by one or more processors is provided and includes: receiving, at a remote automated assistant system, an automated assistant request transmitted by a client device that includes a display device. The method further includes determining, by the remote automated assistant system and based on content of the automated assistant request: an automated assistant agent for the automated assistant request, and a user distance measure that indicates a current distance between the client device and a user that is in an environment with the client device. The method further includes transmitting, by the remote automated assistant system and to the determined automated assistant agent for the automated assistant request, an agent request that includes the user distance measure. The method further includes receiving, by the remote automated assistant system and from the automated assistant agent in response to the agent request, content items that are adapted for the user distance measure. The method further includes transmitting, from the remote automated assistant to the client device in response to the automated assistant request, the content items that are adapted for the user distance measure. Transmitting the responsive content causes the client device to render the responsive content via the display device of the client device.

These and other implementations of the technology disclosed herein can include one or more of the following features.

In some implementations, determining the user distance measure includes determining that the user distance measure satisfies a first distance threshold and a second distance threshold, and the content items include a first subset of content items adapted for the first distance threshold and a second subset of content items adapted for the second distance threshold. In some versions of those implementations, the client device is configured to determine the user distance measure and select data for rendering the responsive content from one of the first subset of content items and the second subset of content items. In some of those versions, the client device is further configured to render the responsive content based on first subset of content items when the user distance measure exclusively satisfies the first distance threshold, and render the responsive content based on the second subset of content items when the user distance measure exclusively satisfies the second distance threshold. The first subset of content items can include data that embodies a data format that is omitted from the second subset of content items.

In some implementations, a method implemented by one or more processors is provided and includes determining, based on output from one or more sensors associated with a client device in an environment, that a given user, of multiple users in the environment, is a currently active user for an automated assistant accessible via the client device. The method further includes, determining, based on the output from the one or more sensors and/or based on additional output (from the one or more sensors and/or other sensor(s)), a distance measure corresponding to a distance of the given user relative to the client device. The method can further include causing content, that is tailored to the distance of the given user, to be rendered by the client device. The content is tailored to the distance of the given user, in lieu of other of the user(s) in the environment, based on determining that the given user is the currently active user for the automated assistant.

These and other implementations of the technology can optionally include one or more of the following features.

In some implementations, the method can further include generating the content that is tailored to the distance of the given user, where generating the content that is tailored to the distance of the given user is based on determining that the given user is the currently active user for the automated assistant. In some of those implementations, generating the content that is tailored to the distance of the given user includes: transmitting an agent request to a given agent, where the agent request includes the distance measure; and receiving the content from the given agent in response to transmitting the agent request.

In some implementations, the method can further include: during rendering of the content, determining that the given user has relocated and is at a new estimated distance relative to the client device. In some of those implementations, the method can further include, based on the given user being the currently active user, and in response to determining that the given user has relocated and is at the new estimated distance relative to the client device, causing second content, that is tailored to the new estimated distance, to be rendered by the client device. In some versions of those implementations, causing the second content to be rendered by the client device can include causing the client device to supplant the content with the second content. In some other versions of those implementations, the content can include only audible content and the second content can include graphical content, and causing the second content to be rendered by the client device can include causing the second content to be rendered along with the content.

In some implementations, causing content, that is tailored to the distance of the given user, to be rendered by the client device can include selecting the content, in lieu of other candidate content, based on the selected content corresponding to the distance measure and the other candidate content failing to correspond to the distance measure.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
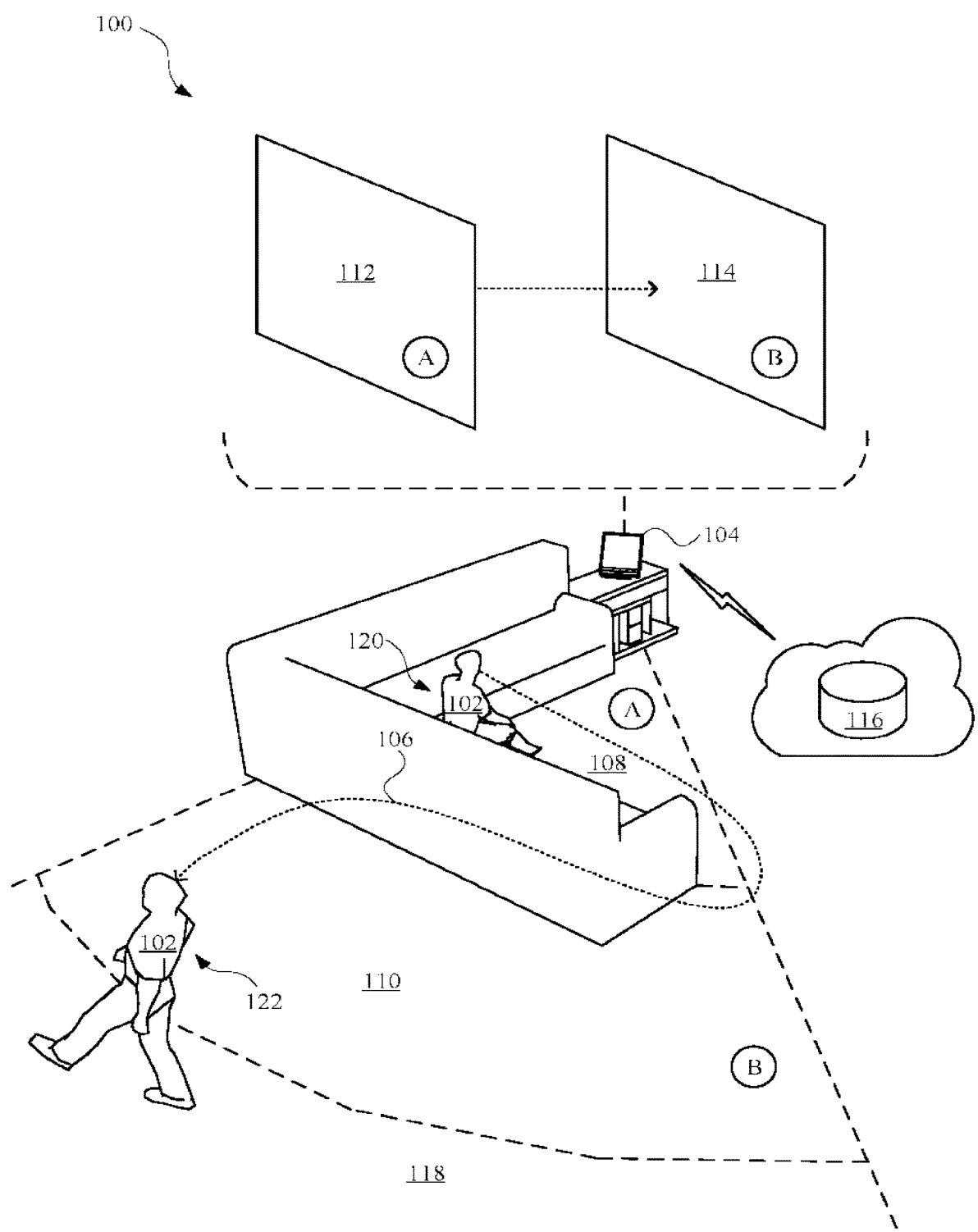
FIG. 1 illustrates a diagram that provides an example of adapting responsive content according to a distance of a user relative to a client device and/or an automated assistant interface.

FIG. 1 illustrates a diagram 100 that provides an example of adapting responsive content according to a distance of a user 102 relative to a client device 104 and/or an automated assistant interface. The implementations discussed here relate to generating and/or adapting content according to changes in position of a user 102 that is directly or indirectly attempting to access the content via an automated assistant. Generally, a computing device can adapt content according to a distance of the user relative to the computing device; however, such content can be limited to what is locally available to the computing device. Furthermore, such limitations on availability of data to what is locally accessible can inhibit the efficiency of the computing device when more suitable data can be quickly retrieved from an external source, such as a remote server. For instance, a user that is more proximate to a computing device with a display panel and speakers may more readily or quickly comprehend data, such as a weekly weather forecast, that is presented at the display panel rather than projected over the speakers as audio. Therefore, by adapting such data according to a proximity of the user to the computing device, the computing device can reduce an amount of time that a particular output is presented at an interface, such as at the speakers of the computing device.

In some implementations discussed herein, the user 102 can request an action to be performed or initialized by an automated assistant, and in response, any data provided to fulfill the request can be adapted according to a location, or change in location, of a user 102 to a client device 104. The automated assistant can be accessed by the user via an automated assistant interface of the client device 104, such as, but not limited to, a tablet computing device, which can include one or more sensors that can operate as the automated assistant interface and/or provide output for determining a distance of the user from the client device 104. In order to invoke the automated assistant, the user can provide a spoken utterance such as, for example, "Assistant, what is the weather today?" In response, the client device 104 can convert the spoken utterance into audio data, which can be processed at the client device 104 and/or transmitted to a remote device 116 (e.g., a remote server) for processing. Furthermore, in response to receiving the spoken utterance, the client device 104 can determine a distance measure corresponding to a distance between the user 102 and the client device 104, or a distance between the user 102 and a peripheral device that is in communication with the client device 104. The client device 104 can transmit the audio data and the distance measure to the remote device 116 in order for the remote device 116 to determine an action and/or application the user is seeking to initialize via the automated assistant.

In various implementations, the client device 104 determines the distance measure locally based on output from one or more sensors. For example, the client device 104 can process image(s) captured by a monographic camera of the client device 104 to estimate a distance of a user. For instance, the client device 104 can estimate of the distance of the user by processing the image (e.g., using one or more local machine learning models) to classify a region of the image as likely including a human's head, and can estimate a distance of the user based on a size of the user's head in the image (e.g., based on the size of the region). As another example, the client device 104 can estimate the distance of a user based on output from a stereographic camera of the client device 104, such as stereographic images that include a depth channel. For instance, the client device 104 can process the image (e.g., using one or more local machine learning models) to classify a region of the stereographic image as likely including a human, and can estimate a distance for that human based on depth value(s) for that region (e.g., based on a mean, median, or other statistical measure of multiple depth values). As yet another example, the client device 104 can estimate the distance of a user based on output from microphone(s) of the client device 104. For instance, the client device can analyze audio data, that corresponds to a spoken utterance of a user, using beamforming and/or other techniques to estimate a distance of the user. As yet another example, the client device 104 can estimate the distance based on outputs from a combination of sensors, such as based on output from a vision sensor and based on output from microphone(s). Additional and/or alternative sensor(s) can be utilized, such as dedicated distance sensors, Light Detection and Ranging (LIDAR) sensors, etc. Also, in some implementations, the client device 104 can rely on output from one or more sensors that are external to, but in communication with, the client device 104. Moreover, in various implementations, the client device 104 can optionally provide output from sensor(s) (and/or conversions thereof) to the remote device 116, and the remote device 116 can optionally determine the distance measure based on such provided data.

A determined action can be associated with content items, which can be provided by an automated assistant, an application that is accessible to the client device, and/or a third party (or first party) agent that is hosted at a separate remote device 116. In some implementations, the remote device 116 can compare the received distance measure to one or more distance threshold values (e.g., threshold values corresponding to a first distance threshold 108 and a second distance threshold 110) to determine a suitable subset of content items that can be used to render content for the user. Alternatively, or additionally, the remote device 116 can provide the distance measure to the application that will be tasked with providing the content items, and the application can perform the comparison of the distance measure to one or more distance threshold values in order to identify the suitable subset of content items. Alternatively, or additionally, the application can receive the distance measure and provide the distance measure as an input to a model that is configured to provide one or more values, which can provide a basis from which to generate and/or select a subset of content items.

A suitable subset of content items for a particular distance measure can be one that can be used to render content that is more readily perceived by the user 102 compared to content rendered based on other distance measures. For instance, when a location of a user 102 corresponds to a first distance threshold 108 that is nearest to, or within a viewable range of, a client device (e.g., a distance of N away from the client device, where N can be any distance that can define a limit of a viewable range of a device), the subset of content items that is selected for rendering first content 112 can include video data (e.g., an image or a video that presents a weather forecast). Furthermore, when the location of the user 102 corresponds to a second distance threshold 110 that is close to a non-viewable range of the client device (e.g., between N and N+m, where m is any positive real number), the subset of content items that is selected for rendering second content 114 can include image data and/or a lower quality video data relative to the aforementioned video data (e.g., an image or a video that includes larger and less graphical elements than the aforementioned image or video). Additionally, when the location of the user corresponds to a third distance threshold 118 that is within a non-viewable range of the client device (e.g., between N+m and N+p, wherein p is any positive real number greater than m), the subset of content items that is selected for rendering content can include audio data (e.g., a voice recording of a person providing a weather forecast). When the subset of content items has been selected based on the distance measure, the subset of content items can be transmitted from the remote device 116 to the client device 104, in order that the client device 104 can render content using the selected subset of content items. It should be noted that the labels "A" and "B" illustrate a correlation between each respective distance threshold (i.e., first distance threshold 108 and second distance threshold 110) and each respective rendered content (i.e., first content 112 and second content 114).

In some implementations, while rendering first content 112 using the selected subset of content items, the user 102 can relocate from a first position 120 to a second position 122. The change of distance of the user 102, or the latest distance of the user 102, can be detected at the client device 104, and an additional distance measure can be generated at the client device 104 and/or the remote device 116. The additional distance measure can then be used to select an additional subset of content items from which to render further content for the user 102 while the user remains at the second position 122. For example, while the client device 104 is rendering visual content (i.e., first content 112) corresponding to a weather forecast and the user is within a viewable range (e.g., a region corresponding to the first threshold 108) of the client device 104, the user 102 can relocate from a first position 120 to a second position 122, which that does not allow them to view the client device 104 (e.g., a position that corresponds to the third threshold 118). In response, the client device 104 can generate a detected or estimated distance measure, which can be provided to the remote device 116.

The remote device 116 can allow the application that previously selected the subset of content items to select the additional subset of content items for rendering the further content for the user 102. The additional subset of content items can be, for example, audio data that can be used to render the further content, which can be perceived by the user 102 despite their relocation to the second position 122. In this way, the client device 104 is not strictly limited to local data for adapting to changes in user distance, but rather can employ remote services and/or applications to identify more suitable data for rendering content. Furthermore, this allows the automated assistant to supplant data during performance of an action in order to that any rendered content will be adapted for a user that changes their relative position.

In some implementations, a user 102 may relocate to a position that corresponds to a tolerance or overlapping range of values corresponding to multiple distance thresholds. As a result, the application or device that is tasked with selecting the subset of content items from which to render content can select multiple subsets of content items. In this way, should the user move from a first location satisfying a first distance threshold to a second location satisfying a second distance threshold, the client device 104 can locally adapt any rendered content according to the change in user location. In some implementations, a trajectory and/or velocity of a user can be similarly used for selecting multiple different subsets of content items from which to render content, in order to adapt the rendered content in real-time as the user is in motion 106. For instance, a user 102 can request their automated assistant to play a song while the user walks toward their television or display projector (e.g., "Assistant, play my favorite song at my television."), and in response, a first subset of content items and a second subset of content items can be selected for rendering content at the television or display projector. The first subset of content items can correspond to audio data, which can be rendered by the television or display projector when the user is furthest away from the television or display projector during their relocation, and the second subset of content items can correspond to audio-video data, which can be rendered by the television or display projector when the user is closest to the television or display projector. In this way, the second subset of content items would supplement the first subset of content items with some amount of mutually exclusive data, because the first subset of content items did not include video data. In some implementations, a rate of change of a position or location of a user and/or a trajectory of a user can be determined by the client device and/or automated assistant in addition to, or in place of, determining the distance. In this way, content can be pre-emptively requested and/or buffered according to the rate of change of the position or location of the user and/or the trajectory of the user. For instance, when user is determined to be moving at a rate of change that satisfies a particular rate of change threshold and/or exhibits a trajectory that is at least partially toward or away from the client device, the client device can render different content in response to the determination and/or request additional data from which other content can be rendered as the user moves toward or away from the client device.

Figure 2A:
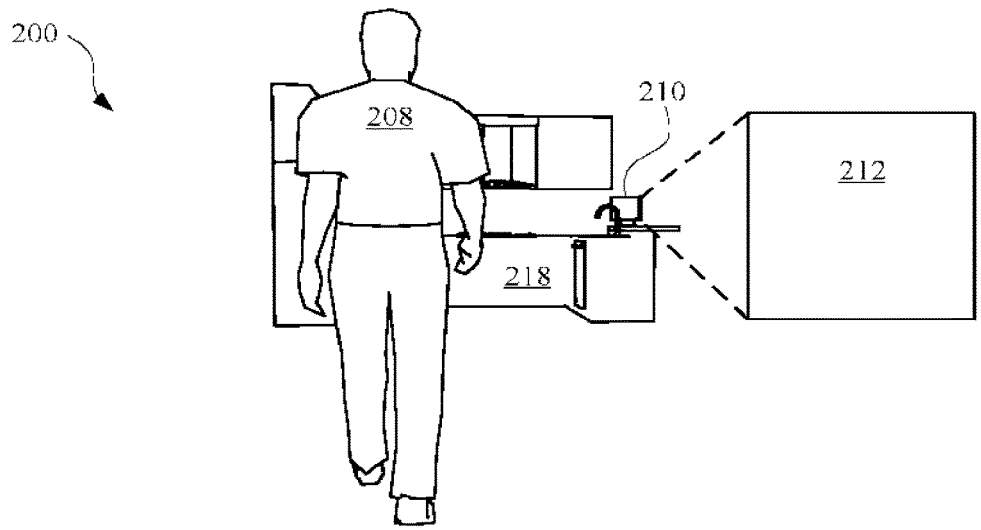
FIGS. 2A, 2B, and 2C illustrate diagrams that provide an example of content being rendered based on a distance of a user relative to a client device.
Figure 2B:
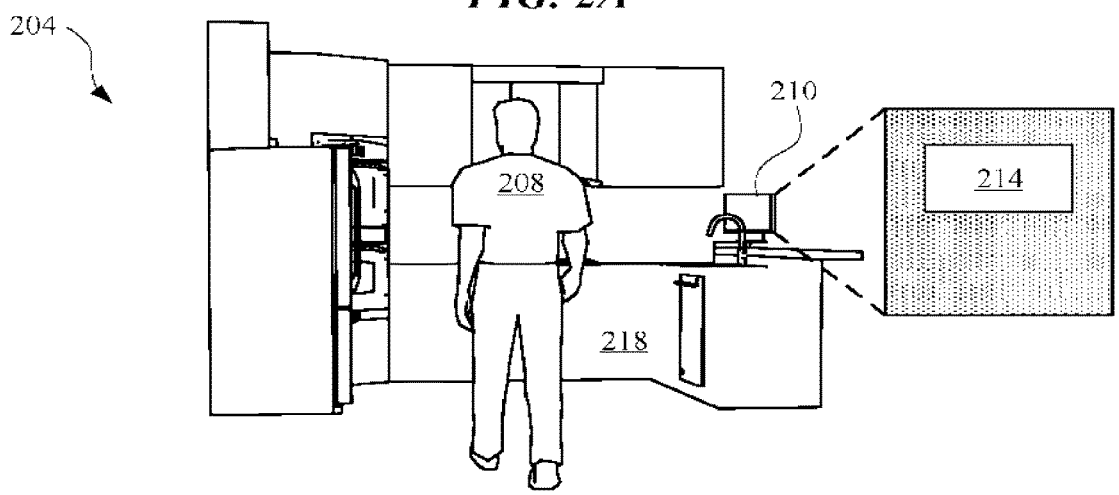
Figure 2C:
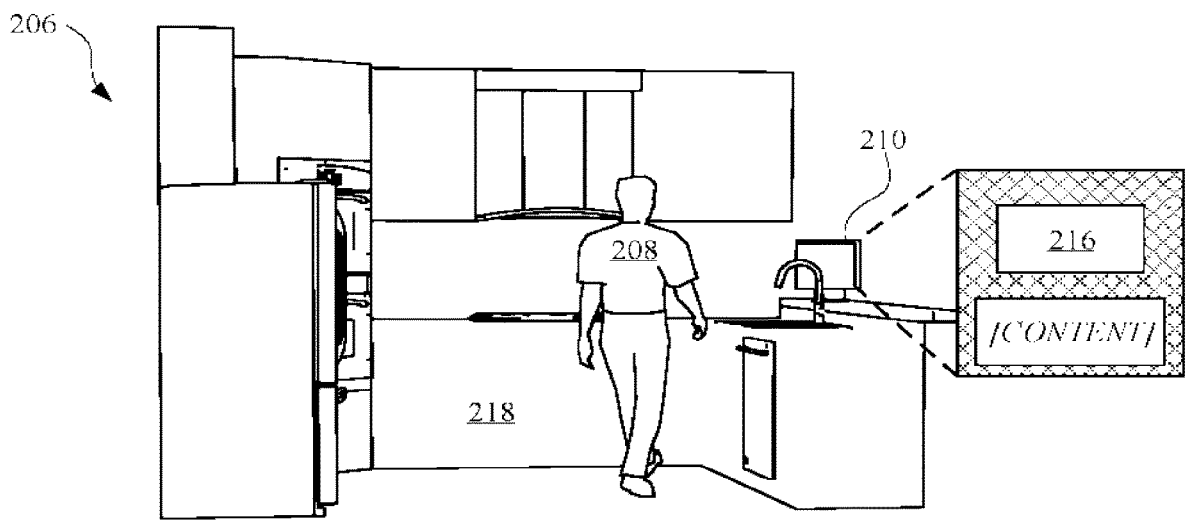

FIGS. 2A-2C illustrate diagrams that provide an example of content being rendered based on a distance of a user relative to a client device 210. Specifically, FIG. 2A illustrates a diagram 200 of a user 208 approaching a client device 210 that is located in an environment 218, such as a kitchen. The user 208 can approach the client device 210 after the user 208 has initialized an automated assistant to performed one or more actions. For instance, the user 208 can trigger a sensor that the user 208 has installed in their kitchen, and in response to the sensor being triggered, the automated assistant can initialize performance of an action. Alternatively, the user 208 can invoke the automated assistant via an automated assistant interface of the client device 210, as discussed herein.

The action to be performed in response to initializing the automated assistant can include presenting media content, such as music, for a user 208. Initially, the automated assistant can cause the client device 210 to render first content 212 that provides little or no graphical content, but rather, provides audible content. This can conserve computational and/or network resources, given that the user 208 is far away from the client device 210, and may therefore not be able to perceive graphical content.

As the user 208 relocates closer to the client device 210, as provided in diagram 204, the client device 210 can receive and/or process one or more signals, which can provide an indication that the user 208 has moved closer to the client device 210 relative to FIG. 2A. In response, the automated assistant can receive some amount of data that is based on the one or more signals, and cause the client device 210 to render second content 214 at the client device 210. The second content 214 can include more graphical content than the first content 212, higher volume content relative to the first content 212, and/or provide content having a higher bit rate relative to the first content 212. In some implementations, the second content 214 can include at least some amount of content that is exclusive from the first content 212. Alternatively, or additionally, the second content 214 can be rendered based on data that was not locally available to the client device 210 when the user 208 was in the position corresponding to FIG. 2A, but rather, was retrieved in response to the user 208 relocating to the position corresponding to FIG. 2B.

Furthermore, diagram 206 illustrates how third content 216 can be rendered at the client device 210 as the user 208 relocates to a position that is more proximate to the client device 210, relative to the user 208 in FIGS. 2A and 2B. Specifically, the third content 216 can include content that is tailored for a user that is most proximate to the client device 210. For example, the automated assistant can determine that the user 208 is even more proximate to the client device 210, relative to the FIGS. 2A and 2B, and cause the client device 210 to render textual content (e.g., "[CONTENT]"). The data that provides the basis for the textual content can be locally available when the user 208 is further away, or requested by the client device 210 from a remote device in response to the user 208 having a trajectory that is toward the client device 210. In this way, the content provided at the direction of the automated assistant can be dynamic according to a distance of the user 208 from the client device 210. Furthermore, the client device 210 can render unique content depending where a user 208 is positioned relative to the client device 210.

Figure 3:
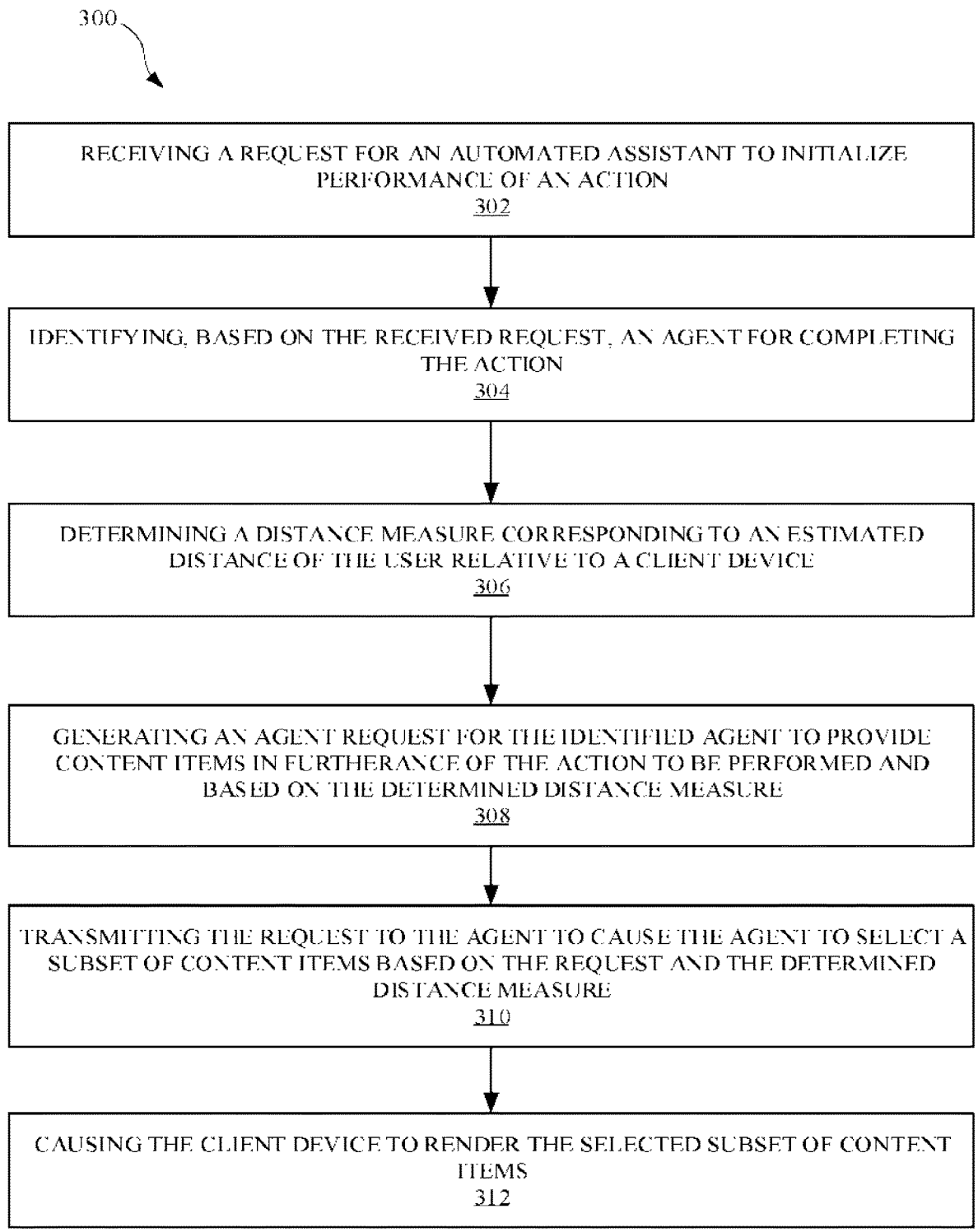
FIG. 3 illustrates a method for rendering automated assistant content according to a distance between a user and automated assistant interface.

FIG. 3 illustrates a method 300 for rendering automated assistant content according to a distance between a user and automated assistant interface. The method 300 can be performed by one or more computing devices, applications, and/or any other apparatus or module capable of interacting with an automated assistant. The method 300 can include an operation 302 of receiving a request for an automated assistant to initialize performance of an action. The automated assistant can be accessible via an automated assistant interface of a client device, and the client device can include or be in communication with a display device and a sensor. The sensor can provide an output from which a distance of a user relative to the display device can be determined. For example, the sensor can be a camera that provides an output from which images can be generated for determining a distance between the user and the display device. Alternatively, or additionally, the client device can include one or more acoustic sensors, and output from the acoustic sensors analyzed (e.g., using a beamforming technique) to identify a location of a user relative to the client device.

The method 300 can further include an operation 304 of identifying, based on the received request, an agent for completing the action. The agent can be one or more applications or modules accessible to the automated assistant and associated with a third party that is separate from an entity that manages the automated assistant. Additionally, the agent can be configured to provide data for the client device based on the distance of the user relative to the display device. In some implementations, the agent can be one of multiple different agents that can be invoked by the automated assistant in furtherance of one or more actions to by performed based on a direct (e.g., "Assistant, perform [action].") or indirect (e.g., an action performed as part of learned user schedule) of the user.

The method 300 can also include an operation 306 of determining a distance measure corresponding to an estimate distance of the user relative to a client device. The distance measure can be determined based on data provided by the client device. For instance, the sensor of the client device can provide an output that embodies information pertaining to a location of the user relative to the sensor. The output can be processed and embodied in the request for the automated assistant to initialize performance of the action. In some implementations, the distance measure can correspond to various data from which characteristics of a position and/or location of a user can be determined. For example, the distance measure can also indicate a distance between the user and the client device, and an orientation of the user relative to the client device (e.g., whether the user is facing or not facing the client device).

The method 300 can further include an operation 308 of generating an agent request for the identified agent to provide content items in furtherance of the action to be performed and based on the determined distance measure.

The agent request can be generated by the automated assistant and include one or more slot values to be processed by the identified agent. For instance, slot values in the agent request can identify the distance measure, contextual data associated with the received request, such as a time of day, user preference(s), historical data based on previous agent requests, and/or any other data that can be processed by an agent application.

The method 300 can also include an operation 310 of transmitting the request to the agent to cause the agent to select a subset of content items based on the request and the determined distance measure. The subset of content that are selected by the agent can correspond to a user distance threshold. Furthermore, the subset of content can be rendered by the client device uniquely, relative to other content items, based on a correspondence between the user distance threshold and the distance measure. In other words, although the agent can select the subset of content items from a group of content items, the selected subset are tailored for the determined distance measure. Therefore, if a different distance measure was determined, a different subset of content items would be selected, and the client device would render different content based on a different subset of content items.

The method 300 can further include an operation 312 of causing the client device to render the selected subset of content items. The selected subset of content items can be rendered as content that is presented at the display device of the client device. However, in some implementations, the selected subset of content items can be rendered as audible content, video content, audio-video content, static image(s), haptic feedback content, control signal(s), and/or any other output that can be perceived by a person. In some implementations, although the agent generated and/or adapted the selected subset of content items, the client device can further adapt the selected subset of content items according to contextual data available to the client device. For example, the client device can further adapt the subset of content items according to a position of the user, an expression of the user, a time of day, an occupancy of an environment in which the client device and the user share, a geolocation of the client device, a schedule of the user, and/or any other information that can be indicative of a context in which the user is interacting with the automated assistant. For instance—although the action to be performed can include rendering audible content, and the select subset of content items can include audio data because the user is within an audible range of the client device—the client device can dynamically adapt a volume of any rendered audio according to a presence of others in the environment and/or according to whether the user is on the phone or employing an audio subsystem of the client device for a separate action. Alternatively, or additionally—although the action to be performed can include rendering audible content, and the select subset of content items can include audio data because the user is within an audible range of the client device—the client device can cause a different client device to render the audio data when the contextual data indicates that the user has relocated more proximately to the different client device (i.e., a separate distance that is further than a distance previously indicated by the distance measure).

Figure 4:
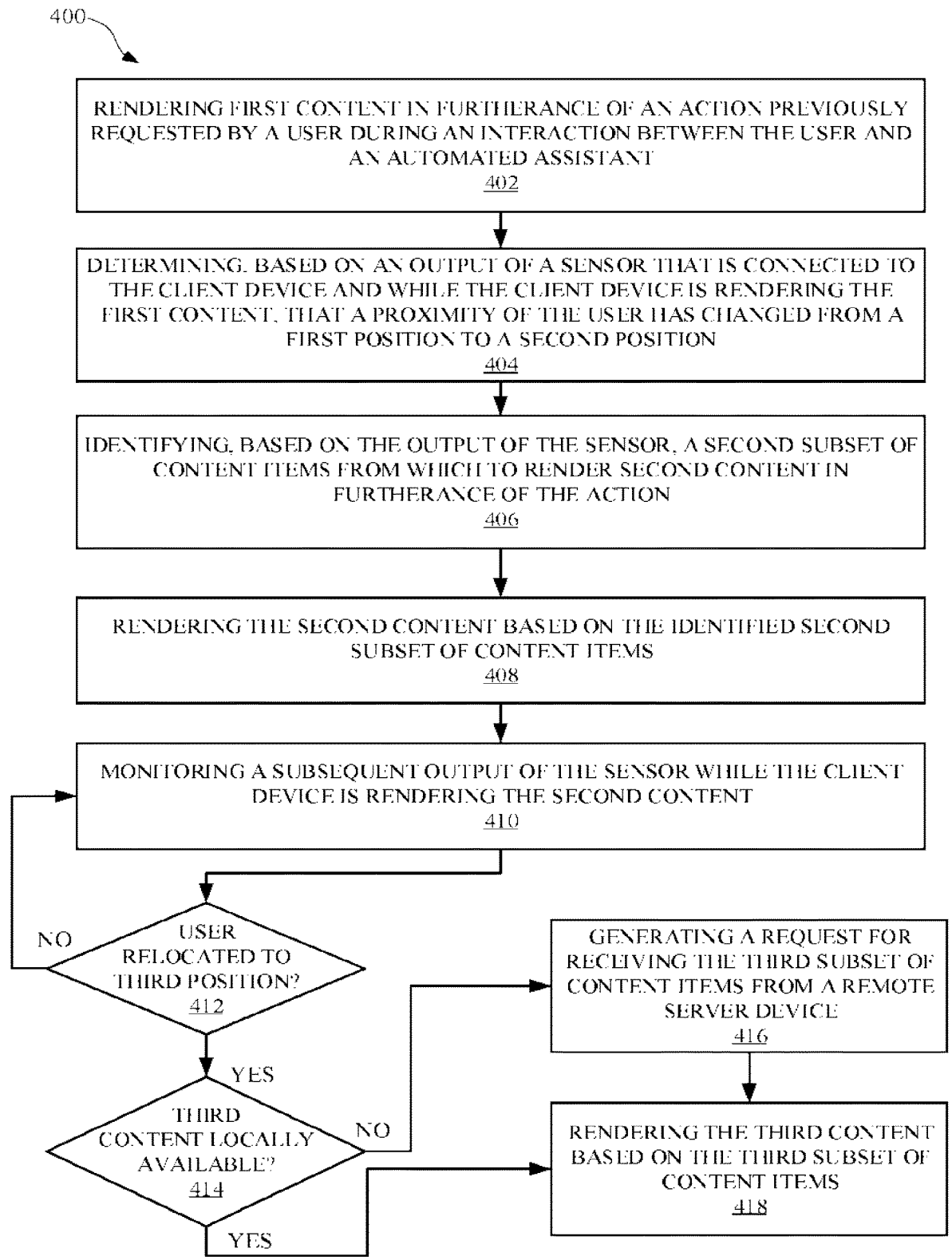
FIG. 4 illustrates a method for adapting automated assistant content based on a position of a user relative to an automated assistant interface.

FIG. 4 illustrates a method 400 for adapting automated assistant content based on a position of a user relative to an automated assistant interface. The method 400 can be performed by one or more computing devices, applications, and/or any other apparatus or module capable of interacting with an automated assistant. The method 400 can include an operation 402 of rendering first content in furtherance of an action previously request by a user during an interaction between the user and an automated assistant. The first content can be rendered by a client device through one or more different modalities of the client device, such as, but not limited to, a touch display panel, a speaker, a haptic feedback device, and/or other interface that can be employed by a computing device. Furthermore, the first content can be rendered based on a first subset of content items that are locally available at the client device. For instance, the first content can be a subset of content items that are retrieved from a remote server device in response to a user initializing a routine to be performed at the direction of the automated assistant. For example, the routine can be a "morning" routine, which is initialized in response to the user entering their kitchen in the morning, and a sensor connected to a client device in the kitchen indicating a presence of the user. As part of the "morning" routine, the automated assistant can download content items corresponding to a schedule of the user. Therefore, the first content items can be associated with the schedule of the user, and the rendered first content can corresponds to a graphical user interface (GUI) with k-number of display elements, where k is any positive whole number.

The method 400 can further include an operation 404 of determining, based on an output of one or more sensors that are connected to the client device and while the client device is rendering the first content, that a proximity of the user has changed from a first position to a second position. For instance, the sensors can include multiple microphones for employing a beamforming technique in order to identify a position of the user. Alternatively, or additionally, the sensors can also include a camera from which an orientation, gaze, and/or position of a user can be determined. Using information from the sensors, the automated assistant can identify, from a plurality of users in the environment, a subset of one or more users that are active, in order to generated and/or adapt content for the active user(s). For example, content can be generated based on a distance of the active user(s), without regard to the distance(s) of user(s) that are not in the subset determined to be active user(s). Furthermore, the information from the sensors can be used to determine a distance of the user from an automated assistant interface, a client device, and/or any other apparatus that can be in communications with a client device. For instance, while the user is viewing the rendered first content, the user can move toward or away from a display panel at which the first content is being rendered.

The method 400 can also include an operation 406 of identifying, based on the output of the sensor, a second subset of content items from which to render second content in furtherance of the action. For example, when the action relates to a "morning" routine, and the content items are associated with a schedule of the user, the second subset of content items can be selected according to an ability of the user to perceive the second subset of content items. More specifically, if the second position is more proximate to the automated assistant interface (e.g., the display panel) than the first position, the second subset of content items can include additional graphical elements from which the user can perceive more information. As a result the user is able to glean more details about their schedule as they move closer to the automated assistant interface. Furthermore, the computational resources used to render the additional graphical elements, which may be triggered in response to the second position being more proximate to the interface than the first position, are used in an efficient manner in line with the discussion above.

The method 400 can additionally include an operation 408 of rendering the second content based on the identified second subset of content items. The rendered second content can correspond to a GUI with l-number of display elements, where l is any positive whole number that is greater than or less than k. For example, the rendered first content can include k-number of display elements that correspond to a schedule of the user for a few hours. Furthermore, the rendered second content can include l-number of display elements that correspond to a schedule of the user for an entire day. In this way, the second subset of content items will have one or more content items that are mutually exclusive to the first subset of content items. As a result, the user will see different graphical elements as they maneuver closer to the display panel.

The method 400 can further include an operation 410 of monitoring a subsequent output of the sensor while the client device is rendering the second content. In some implementations, the automated assistant can monitor the output of the sensor, with permission from the user, in order to determine whether the user has relocated further away from the automated assistant interface or closer to the automated assistant interface. In this way, the automated assistant can cause the rendered content to be further adapted in order that the content will be more efficiently perceived by the user. At operation 412 of method 400, a determination is made as to whether the user has relocated to a third position that is different than the first position and the second position. If the user has not relocated to the third position, then the automated assistant can continue monitoring the output of the sensor, at least according to operation 410. If the user has relocated to the third position, the method 400 can proceed to operation 414.

At operation 414 of method 400, a determination is made as to whether third content is locally available to the client device. The third content can correspond to a third subset of content items that would provide the user with additional information about their schedule, if the third content was rendered at the client device. For example, the third subset of content items can include information about a schedule of the user that was not included in the first subset of content items and/or the second subset of content items. Specifically, the third subset of content items can include at least some amount of data that is mutually exclusive relative to the first subset of content items and the second subset of content items. For instance, the third subset of content items can include a different type of data, such as images and/or video, that was not included in the first subset of content items and/or the second subset of content items. The third subset of content items can include data associated with a schedule for an upcoming week or month of the user, thereby allowing the user to perceive additional information about their schedule as they move closer to the automated assistant interface.

When the third subset of content items is not locally available at the client device, the method 400 can proceed to operation 416, which can include generating a request for receiving the third subset of content items. The request can be transmitted to a remote server device over a network, such as the internet, in order to receive the third subset of content items. For instance, the remote server device can host an agent that is associated with a schedule application accessible to the automated assistant. The agent can receive the request and identify the additional content items associated with the request. The agent can then transmit the additional content items as the third subset of content items to the automated assistant and/or the client device. Thereafter, the method 400 can proceed to operation 418, which can include rendering the third content based on the third subset of content items. Alternatively, when the third subset of content items are locally available at the client device, the operation 416 can be bypassed, and the method 400 can proceed from operation 414 to operation 418.

Figure 5:
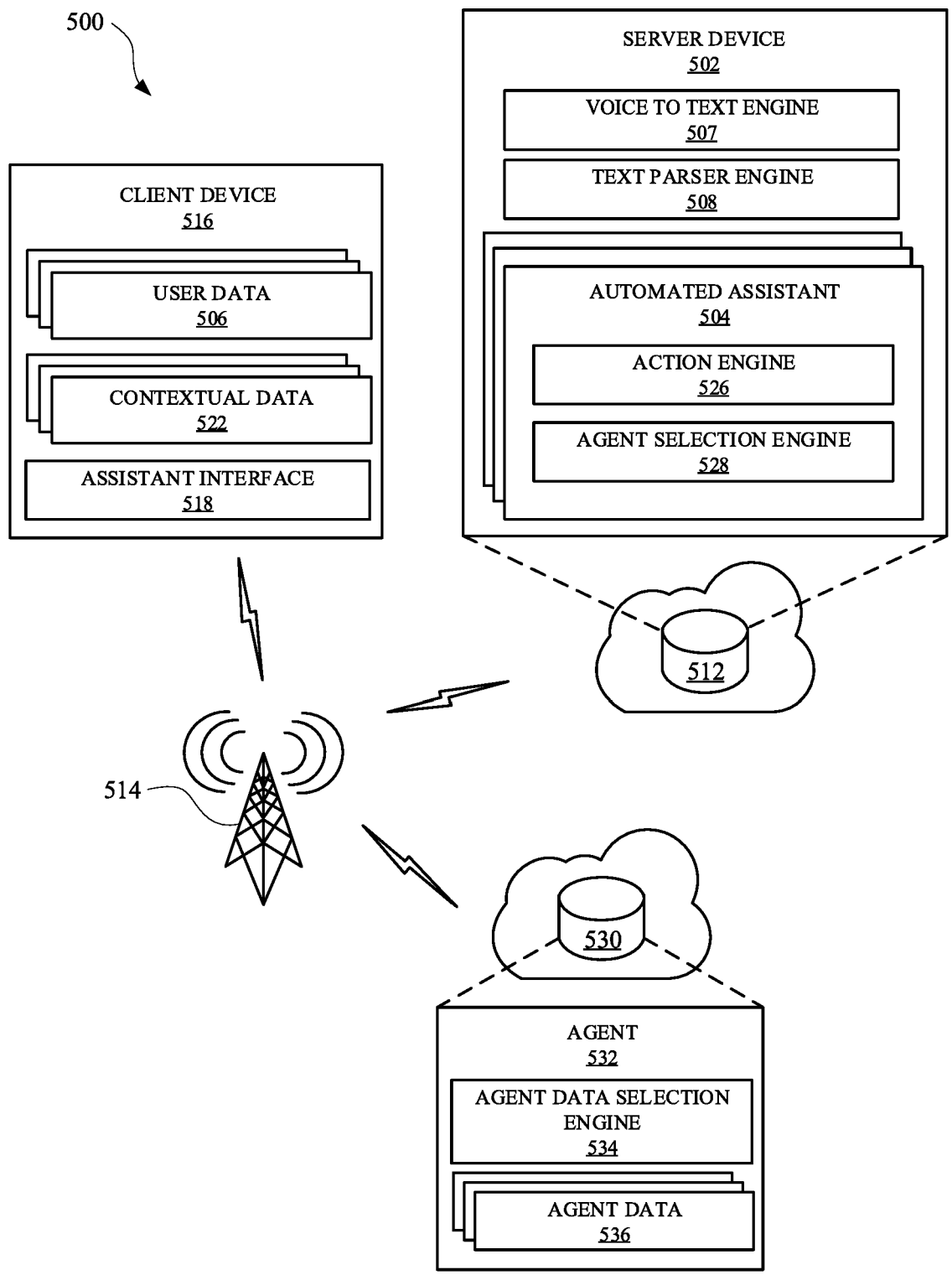
FIG. 5 illustrates a system for adapting responsive content according to a distance of a user relative to a client device and/or an automated assistant interface.

FIG. 5 illustrates a system 500 for adapting responsive content according to a distance of a user relative to a client device 516 and/or an automated assistant interface 518. The automated assistant interface 518 can allow a user to communicate with an automated assistant 504, which can operate as part of an assistant application that is provided at one or more computing devices, such as the client device 516 (e.g., a tablet device, a standalone speaker device, and/or any other computing device), and/or a remote computing device 512, such as a server device 502. The assistant interface 518 can include one or more of a microphone, a camera, a touch screen display, a user interface, and/or any other apparatus or combination of apparatuses capable of providing an interface between a user and an application. For instance, a user can initialize the automated assistant 504 by providing a verbal, textual, and/or a graphical input to the assistant interface to cause the automated assistant 504 to perform a function (e.g., provide data, control a peripheral device, access an agent or third party application, etc.). The client device 516 can include a display device, which can be a display panel that includes a touch interface for receiving touch inputs and/or gestures for allowing a user to control applications of the client device 516 via the touch interface.

The client device 516 can be in communication with the remote computing device 512 over a network 514, such as the internet. The client device 516 can offload computational tasks to the remote computing device 512 in order to conserve computational resources at the client device 516. For instance, the remote computing device 512 can host the automated assistant 504, and the client device 516 can transmit inputs received at one or more assistant interfaces 518 to the remote computing device 512. However, in some implementations, the automated assistant 504 can be hosted at the client device 516. In various implementations, all or less than all aspects of the automated assistant 504 can be implemented on the client device 516. In some of those implementations, aspects of the automated assistant 504 are implemented via a local assistant application of the client device 516, and the local assistant application can interface with the remote computing device 512 for implementing other aspects of the automated assistant 504. The remote computing device 512 can optionally serve a plurality of users and their associated assistant applications via multiple threads. In some implementations where all or less than all aspects of the automated assistant 504 are implemented via a local assistant application of the client device 516, the local assistant application can be an application that is separate from an operating system of the client device 516 (e.g., installed "on top" of the operating system)—or can alternatively be implemented directly by the operating system of the first client device 516 (e.g., considered an application of, but integral with, the operating system).

In some implementations, the remote computing device 512 can include a voice to text engine 507 that can process audio data received at an assistant interface to identify the text embodied in the audio data. The process for converting the audio data to text can include a speech recognition algorithm, which can employ neural networks, word2vec algorithms, and/or statistical models for identifying groups of audio data corresponding to words or phrases. The text converted from the audio data can be parsed by a text parser engine 508 and made available to the automated assistant 504 as textual data that can be used to generate and/or identify command phrases from the user.

In some implementations, the automated assistant 504 can adapt content for an agent 532 that is accessible to the client device 516 and the automated assistant 104. During interactions between the user and the automated assistant 504, user data 506, and/or contextual data 522 can be collected at the client device 516, the server device 502, and/or any other device that can be associated with the user. User data 506 and/or contextual data 522 can be used, with permission from a user, by one or more applications or devices that are integral with or accessible to the client device 516. For instance, contextual data 522 can include data corresponding to temporal data, location data, event data, media data, and/or any other data that can be relevant to interactions between the user and the automated assistant 504. Additionally, user data 506 can include account information, message information, calendar information, user preferences, historical interaction data between the user and the automated assistant 504, content items associated with applications and/or agents that are accessible to the client device 516, and/or any other data that can be associated with a user.

In order for the automated assistant 504 to cause content to be adapted for a user, the automated assistant 504 can interact with an agent 532, which can provide agent data 536 (i.e., content items) to the remote device 512 and/or the client device 516 for rendering content at the automated assistant interface 518. As used herein, an "agent" references one or more computing devices and/or software that is separate from an automated assistant. In some situations, an agent may be a third-party (3P) agent, in that it is managed by a party that is separate from a party that manages the automated assistant. In some implementations, the automated assistant 504 can employ an agent selection engine 528 in order to select an agent, from multiple different agents, for performing a particular action in response to a direct or indirect request from a user. A selected agent can be configured to receive (e.g., over a network and/or via an API) a request from the automated assistant. In response to receiving the request, the agent generates responsive content based on the request, and transmits the responsive content for the provision of output that is based on the responsive content. For example, the agent 532 can transmit the responsive content to the automated assistant 504 for provision of output, by the automated assistant 504 and/or the client device 516, that is based on the responsive content. As another example, the agent 532 can itself provide the output. For instance, the user can interact with the automated assistant 504 via a client device 516 (e.g., the automated assistant can be implemented on the client device and/or in network communication with the client device) and the agent 532 can be an application installed on the client device 516 or an application executable remote from the client device 516, but "streamable" on the client device 516. When the application is invoked, it can be executed by the client device 516 and/or brought to the forefront by the client device (e.g., its content can take over a display of the client device).

Invoking an agent can include transmitting (e.g., utilizing an application programming interface (API)) a request that includes value(s) for invocation parameter(s) (e.g., a value for an intent parameter, value(s) for intent slot parameter(s), and/or value(s) for other parameter(s)), and that causes the agent to generate content for presentation to the user via one or more user interface output devices (e.g., via one or more of the user interface output devices utilized in the dialog with the automated assistant). The responsive content generated by the agent can be tailored to the parameters of the request. For instance, the automated assistant 504 can use data generated based on an output from one or more sensors at the client device 516 to generate one or more distance measures. A distance measure can be embodied as a parameter of a request to an agent 532 in order to the agent data 536 (i.e., responsive content) can be generated, selected, and/or otherwise adapted based on the distance measure. In some implementations, the agent 532 can include an agent data selection engine 534 that generates, selects, and/or adapts agent data 536 based at least one the parameters of the requests received from the remote device 512 and/or the client device 516. In this way, a client device 516 can render content for the user based on a subset of agent data 536 that are provided by the agent 532 according to at least a distance measure corresponding to the user.

Figure 6:
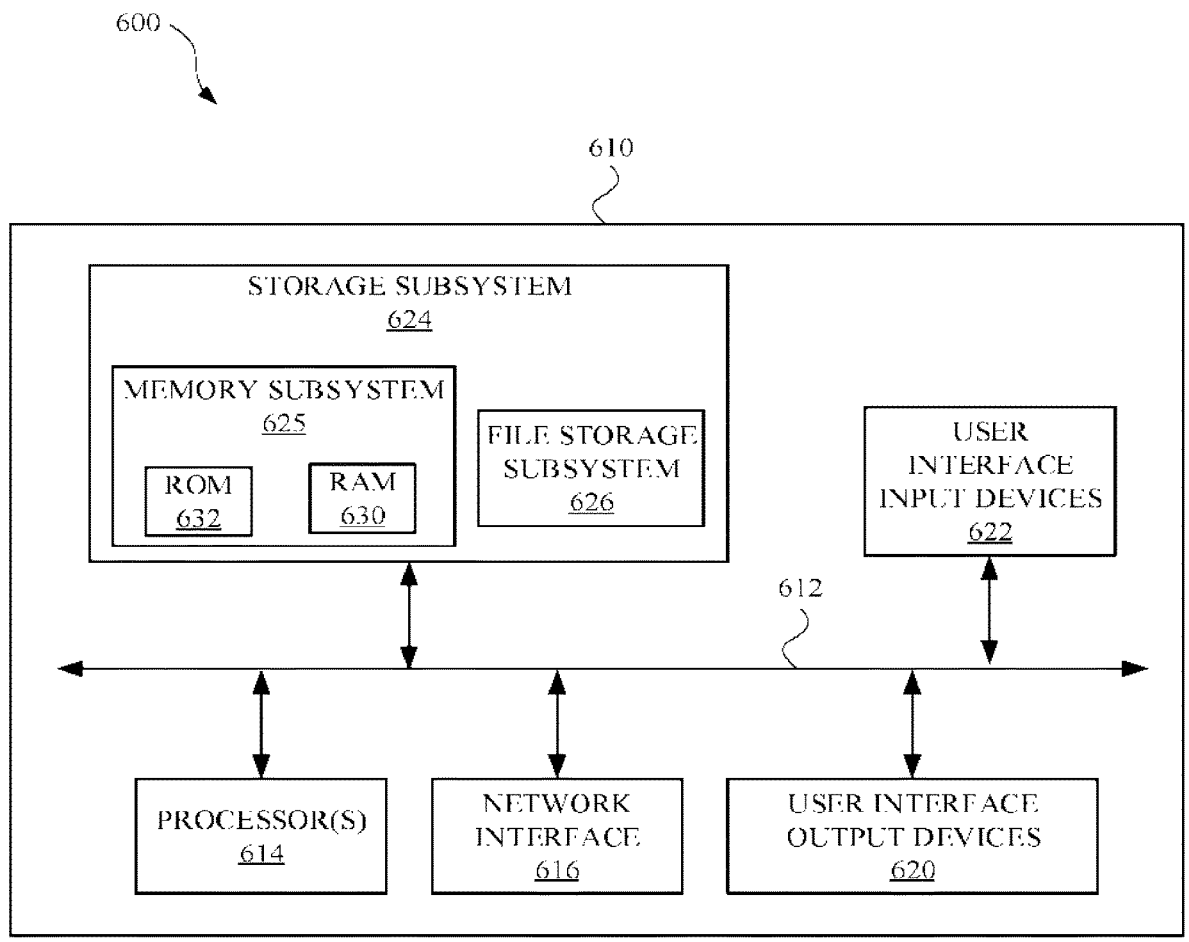
FIG. 6 is a block diagram of an example computer system.

FIG. 6 is a block diagram 600 of an example computer system 610. Computer system 610 typically includes at least one processor 614 which communicates with a number of peripheral devices via bus subsystem 612. These peripheral devices may include a storage subsystem 624, including, for example, a memory 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 300, method 400, and/or to implement one or more of client device 104, remote device 116, client device 516, server device 502, remote device 512, remote device 530, automated assistant 504, agent 532, and/or any other apparatus or operation discussed herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, the method comprising:
   receiving a request to perform one or more actions using an automated assistant of a client device;
   determining that a user, from a plurality of users in an environment with the client device, provided the request and that the user is a current active user of the client device;
   in response to determining the user is the current active user of the automated assistant of the client device, determining a distance of the user relative to a display of the client device;
   selecting, from a plurality of content items corresponding to the one or more actions and based on the determined distance of the user relative to the display of the client device, a subset of the plurality of content items, where one or more further content items of the plurality of content items are excluded from the subset; and
   causing the client device to render output at the display based on the selected subset of content items corresponding to the one or more actions.

2. The method of claim 1, wherein determining the distance of the user relative to the display of the client device comprises determining the distance of the user, in lieu of one or more additional users of the plurality of users in the environment.

3. The method of claim 2, where determining that the user, from the plurality of users in the environment with the client device, provided the request and is the current active user of the client device comprises:
   determining whether the user is the current active user based on one or both of:
      a pose of the user determined based on one or more instances of vision data, and
      a gaze of the user determined based on the one or more instances of vision data.

4. The method of claim 1, further comprising:
   receiving an additional request to perform one or more additional actions using the automated assistant of the client device;
   determining that the user provided the additional request and is also the current active user for the additional request;
   in response to determining that the user is the current active user for the additional request, determining an additional distance of the user relative to the display of the client device;
   selecting, from a plurality of additional content items corresponding to the one or more additional actions and based on the determined additional distance of the user relative to the display of the client device, an additional subset of the plurality of additional content items, where one or more further additional content items of the plurality of additional content items are excluded from the additional subset; and
   causing the client device to render output at the display based on the selected additional subset of content items corresponding to the one or more additional actions.

5. The method of claim 4, wherein the user moved from an initial position when making the request to perform the one or more actions to an additional position when making the additional request to perform the one or more additional actions, wherein the determined distance of the user relative to the display of the client device is based on the initial position of the user, wherein the determined additional distance of the user relative to the display of the client device is based on the additional position of the user.

6. The method of claim 4, wherein the user was in a given position when making the request to perform the one or more actions and remained in the given position when making the additional request to perform the one or more additional actions, the determined distance of the user relative to the display of the client device is based on the given position of the user, wherein the determined additional distance of the user relative to the display of the client device is based on the given position of the user.

7. A system comprising:
one or more processors; and
memory configured to store instructions that, when executed by the one or more processors, cause the one or more processors to perform operations that include:
    receiving a request to perform one or more actions using an automated assistant of a client device;
    determining that a user, from a plurality of users in an environment with the client device, provided the request and that the user is a current active user of the client device;
    in response to determining the user is the current active user of the automated assistant of the client device, determining a distance of the user relative to a display of the client device;
    selecting, from a plurality of content items corresponding to the one or more actions and based on the determined distance of the user relative to the display of the client device, a subset of the plurality of content items, where one or more further content items of the plurality of content items are excluded from the subset; and
    causing the client device to render output at the display based on the selected subset of content items corresponding to the one or more actions.

8. The system of claim 7, wherein determining the distance of the user relative to the display of the client device comprises determining the distance of the user, in lieu of one or more additional users of the plurality of users in the environment.

9. The system of claim 8, where determining that the user, from the plurality of users in the environment with the client device, provided the request and is the current active user of the client device comprises:
determining whether the user is the current active user based on one or both of:
    a pose of the user determined based on one or more instances of vision data, and
    a gaze of the user determined based on the one or more instances of vision data.

10. The system of claim 7, wherein the operations further include:
receiving an additional request to perform one or more additional actions using the automated assistant of the client device;
determining that the user provided the additional request and is also the current active user for the additional request;
in response to determining that the user is the current active user for the additional request, determining an additional distance of the user relative to the display of the client device;
selecting, from a plurality of additional content items corresponding to the one or more additional actions and based on the determined additional distance of the user relative to the display of the client device, an additional subset of the plurality of additional content items, where one or more further additional content items of the plurality of additional content items are excluded from the additional subset; and
causing the client device to render output at the display based on the selected additional subset of content items corresponding to the one or more additional actions.

11. The system of claim 10, wherein the user moved from an initial position when making the request to perform the one or more actions to an additional position when making the additional request to perform the one or more additional actions, wherein the determined distance of the user relative to the display of the client device is based on the initial position of the user, wherein the determined additional distance of the user relative to the display of the client device is based on the additional position of the user.

12. The system of claim 10, wherein the user was in a given position when making the request to perform the one or more actions and remained in the given position when making the additional request to perform the one or more additional actions, the determined distance of the user relative to the display of the client device is based on the given position of the user, wherein the determined additional distance of the user relative to the display of the client device is based on the given position of the user.

13. A non-transitory computer readable medium configured to store instructions that, when executed by one or more processors, cause the one or more processors to perform operations that include:
receiving a request to perform one or more actions using an automated assistant of a client device;
determining that a user, from a plurality of users in an environment with the client device, provided the request and that the user is a current active user of the client device;
in response to determining the user is the current active user of the automated assistant of the client device, determining a distance of the user relative to a display of the client device;
selecting, from a plurality of content items corresponding to the one or more actions and based on the determined distance of the user relative to the display of the client device, a subset of the plurality of content items, where one or more further content items of the plurality of content items are excluded from the subset; and
causing the client device to render output at the display based on the selected subset of content items corresponding to the one or more actions.

14. The non-transitory computer readable medium of claim 13, wherein determining the distance of the user relative to the display of the client device comprises determining the distance of the user, in lieu of one or more additional users of the plurality of users in the environment.

15. The non-transitory computer readable medium of claim 14, where determining that the user, from the plurality of users in the environment with the client device, provided the request and is the current active user of the client device comprises:
determining whether the user is the current active user based on one or both of:
    a pose of the user determined based on one or more instances of vision data, and
    a gaze of the user determined based on the one or more instances of vision data.

16. The non-transitory computer readable medium of claim 13, wherein the operations further include:

receiving an additional request to perform one or more additional actions using the automated assistant of the client device;

determining that the user provided the additional request and is also the current active user for the additional request;

in response to determining that the user is the current active user for the additional request, determining an additional distance of the user relative to the display of the client device;

selecting, from a plurality of additional content items corresponding to the one or more additional actions and based on the determined additional distance of the user relative to the display of the client device, an additional subset of the plurality of additional content items, where one or more further additional content items of the plurality of additional content items are excluded from the additional subset; and causing the client device to render output at the display based on the selected additional subset of content items corresponding to the one or more additional actions.

17. The non-transitory computer readable medium of claim 16, wherein the user moved from an initial position when making the request to perform the one or more actions to an additional position when making the additional request to perform the one or more additional actions, wherein the determined distance of the user relative to the display of the client device is based on the initial position of the user, wherein the determined additional distance of the user relative to the display of the client device is based on the additional position of the user.

18. The non-transitory computer readable medium of claim 16, wherein the user was in a given position when making the request to perform the one or more actions and remained in the given position when making the additional request to perform the one or more additional actions, the determined distance of the user relative to the display of the client device is based on the given position of the user, wherein the determined additional distance of the user relative to the display of the client device is based on the given position of the user.

* * * * *